United States Patent [19]

Hazelton et al.

[11] Patent Number: 4,639,487

[45] Date of Patent: Jan. 27, 1987

[54] HEAT SHRINKABLE THERMOPLASTIC OLEFIN COMPOSITION

[75] Inventors: Donald R. Hazelton, Chatham; Robert C. Puydak, Cranbury, both of N.J.

[73] Assignee: Exxon Research & Engineering Co., Florham Park, N.J.

[21] Appl. No.: 629,634

[22] Filed: Jul. 11, 1984

[51] Int. Cl.[4] .................... C08J 3/24; C08L 23/26; C08L 15/02; C08L 33/04
[52] U.S. Cl. ................... 524/425; 524/445; 524/523; 524/524; 525/192; 525/194; 525/195; 525/196; 525/211; 525/215; 525/232; 525/237; 525/233; 525/240; 525/230; 525/197; 525/221; 525/222; 525/227
[58] Field of Search ............... 525/232, 237, 192–194, 525/240, 196, 211, 221, 222, 227; 524/425

[56] References Cited

U.S. PATENT DOCUMENTS

| 3,037,954 | 6/1962 | Gessler et al. | 525/141 |
|---|---|---|---|
| 3,592,881 | 7/1971 | Ostapchenko | 525/232 |
| 3,758,643 | 9/1973 | Fischer | 525/211 |
| 3,904,470 | 9/1975 | Fukuki et al. | 525/240 |
| 4,087,485 | 5/1978 | Huff | 525/240 |
| 4,104,210 | 8/1978 | Coran et al. | 525/232 |
| 4,130,534 | 12/1978 | Coran et al. | 525/232 |
| 4,202,801 | 5/1980 | Peterson | 525/232 |
| 4,212,787 | 7/1980 | Matsuda et al. | 525/232 |
| 4,348,266 | 9/1982 | Coran et al. | 204/159.2 |
| 4,350,795 | 9/1982 | Bohm et al. | 525/194 |

FOREIGN PATENT DOCUMENTS 8145741 8/1983 Japan .................. 525/240

Primary Examiner—Carman J. Seccuro

[57] ABSTRACT

Heat shrinkable thermoplastic compositions are prepared by blending an ethylene copolymer resin with a rubber and dynamically vulcanizing the rubber. The ethylene copolymer resin is a copolymer of ethylene with an alkyl ester of an alpha, beta monoethylenically unsaturated monocarboxylic acid as well as copolymers of ethylene with the acid per se. The preferred copolymer is ethylene-vinyl-acetate copolymer. The preferred rubber is halogenated butyl rubber. Uncured rubber can be included in the composition.

33 Claims, No Drawings

HEAT SHRINKABLE THERMOPLASTIC OLEFIN COMPOSITION

BACKGROUND OF THE INVENTION

In recent years there has been a significant commercial interest in polymer blends which have a combination of both elastic and thermoplastic properties. These polymer blends have been given the generic designation of Thermoplastic Olefins ("TPO"). They exhibit some of the properties of a cured elastomer as well as the reprocessibility of thermoplastic resins. The elastomeric characteristics are enhanced if one component of the blend is a vulcanizable elastomer which is wholly or partially cross-linked.

The earliest work in the curing of TPO compositions area was by Gessler and Haslett; see U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The result is a micro-gel dispersion of cured rubber in an uncured matrix of resinous thermoplastic polymer. Gessler, '954 discloses compositions comprising polypropylene and a rubber wherein the rubber can be, inter alia, butyl rubber, chlorinated butyl rubber, polybutadiene, polychloroprene and polyisobutene. Compositions of about 50 to 95 parts polypropylene and about 5 to 50 parts of rubber are disclosed.

U.S. Pat. Nos. 3,758,643 and 3,806,558 disclose TPO type polymers comprising an olefin resin and olefin copolymer rubber wherein the rubber is dynamically cured to a partial cure state. These compositions are reprocessible and result in molded products having good surface appearance. However, the potential applications of these products is limited because of high compression set and/or low softening temperature resulting from only a partial cure of the rubber. Furthermore, the partial peroxide cure utilized is difficult to control from the standpoint of completeness of reaction, resulting in batch to batch variations in product properties.

U.S. Pat. No. 4,130,534 discloses TPO blends which comprise a polyolefin resin and a butyl rubber wherein the blend comprises up to 60 wt% of polyolefin resin and 40 wt% or more of a rubber. The butyl rubbers which can be utilized include butyl rubber per se as well as chlorinated or brominated butyl rubber. In the preferred embodiment, the polyolefin resin comprises 20 to 45 wt% of the blend and the rubber comprises about 80 to 55 wt% of the blend. The rubber is said to be fully cured, the cure being a dynamic vulcanization.

U.S. Pat. No. 4,130,535 discloses TPO compositions wherein the rubber component is an ethylene propylene copolymer ("EPM") or terpolymer ("EPDM"). The preferred thermoplastic polyolefin resins are polypropylene and polyethylene. The compositions comprise about 75 to about 25 wt% polyolefin resin and about 25 to about 75 wt% rubber. The rubber is dynamically cured to a fully cured state. Similar compositions are disclosed in U.S. Pat. No. 4,311,628 wherein the cure system for the rubber is a metal activated haloresin cure, e.g., brominated dimethylol phenol resins.

These TPO systems wherein the rubber is fully cured have the disadvantage that, as a result of poor flow characteristics, injection molded components made from these TPO's exhibit "flow line" imperfections. As a consequence, special mold designs are required to minimize the problem, especially for large parts. Application are further limited because of the high Shore A hardness of the composition.

U.S. Pat. No. 4,409,365 discloses TPO compositions in which a polyolefin resin is combined with an EPDM and a nitrile rubber. The rubbers are vulcanized and the product is said to have improved oil resistance.

U.S. Pat. No. 3,081,279 discloses compositions wherein a rubber such as butyl rubber is combined with a sulfochlorinated polyolefin resin and cured. The uncured blend is said to have improved processing characteristics.

U.S. Pat. No. 2,369,471 discloses blends of ethylene polymers with various hydrocarbon rubbers and halogenated rubbers. The compositions are either uncured or compression molded vulcanizates.

U.S. Pat. No. 4,302,557 discloses a shrink film which comprises an EPM or EPDM rubber and a low density polyethylene or soft ethylene copolymer such as ethylene vinylacetate. Alternatively, the polymer blends can include polypropylene or high density polyethylene (HDPE). Another variant of the disclosed composition comprises the ethylene copolymer rubber with the polypropylene or HDPE. The rubber can be unvulcanized or, in the alternative a film of the blend is prepared and radiation cross-linked to form a heat shrinkable film.

U.S. Pat. No. 4,212,787 discloses a combination of a peroxide curable rubber and a peroxide decomposible polyolefin resin which may, alternatively have incorporated therein a non-peroxide curable rubber such as polyisobutylene. The peroxide curable rubber is preferably an ethylene propylene rubber (EPR) and the peroxide decomposible polymer is preferably polypropylene. The curable rubber is partially cured in the manner of U.S. Pat. No. 3,866,558, supra. The partial curing can be carried out in the presence of divinyl benzene. The product is said to have improved flexibility and rebound elasticity. The compositions comprise about 100 to 5 parts by weight of a partially cured elastomer which is prepared by the dynamic heat treatment in the presence of a peroxide of a mixture of 100 to 40 parts by weight of (a) peroxide-curable olefin copolymer rubber and 0 to 60 parts by weight of (b) a peroxide-decomposible olefin plastic; and 5 to 100 parts of at least one (c) peroxide non-curable hydrocarbon rubber.

U.S. Pat. No. 3,326,833 discloses compositions of a copolymer of ethylene with an alkyl ester of an alpha-beta-monethylenically unsaturated monocarboxylic acid, e.g., ethylene-ethylacrylate copolymer, and a halogenated olefin polymer. The rubber can be halogenated butyl rubber or chlorinated polyethylene. The compositions are either uncured and thermoplastic or peroxide cross-linked to form insoluble non-thermoplastic resins.

U.S. Pat. No. 4,303,571 discloses blends of ethylene-vinylacetate copolymers with EPM or EPDM and a hydrocarbon oil plasticizer. The films exhibit resiliency, elasticity and high melt flow properties. The rubber component of the blend is unvulcanized.

Other TPO compositions have been prepared utilizing a thermoplastic polyolefin resin in conjunction with a rubber. U.S. Pat. No. 4,104,210 discloses compositions wherein the rubber is a diolefin rubber, e.g., natural rubber, polyisoprene, nitrile rubber or styrene butadiene rubber. The rubber is fully cured. U.S. Pat. No. 4,211,049 discloses particular curatives for the TPO compositions containing diolefin rubbers, e.g., phenolic curatives, urethane curatives and certain sulfur donor curatives. U.S. Pat. No. 4,141,878 discloses TPO compositions wherein the rubber is cross-linked chlorosulfonated polyethylene.

To achieve high shrink character, most shrink films, tubing and tapes require radiation cross-linking after the component is formed; see, for example, U.S. Pat. No. 4,302,447, supra. This requires an extra processing step as well as a capital investment in radiation curing equipment. It would be economically attractive to accomplish the same effect without the need for radiation curing. Prior art heat shrinkable materials of the TPO type based on EPM or EPDM with polyethylene or polyethylene copolymers or other polymers that are peroxide cured are rendered unreprocessible.

SUMMARY OF THE INVENTION

It has surprisingly been found that a heat shrinkable, reprocessible TPO can be prepared by utilizing as the thermoplastic polyolefin resin an ethylenevinyl ester or ethylene-alkylacrylate copolymer and fully curing the rubber component of the TPO by dynamic vulcanization. The preferred polyolefin resin is ethylene-vinlyacetate and the preferred rubber is halogenated butyl rubber. Films and tapes made of this reprocessible composition exhibit good heat shrink properties.

DETAILED DESCRIPTION

This invention relates to heat shrinkable compositions. In particular it relates to thermoplastic elastomeric heat shrinkable compositions which, while having the reprocessibility of thermoplastic resins, are yet heat shrinkable and elastomeric in nature. The surprising result of this invention is accomplished by blending a thermoplastic ethylene copolymer resin with a rubber and vulcanizing the rubber by dynamic vulcanization techniques.

As used in the specification and claims, the term "dynamic vulcanization" means a vulcanization process for a rubber containing TPO composition wherein the rubber is vulcanized under conditions of high shear. As a result, the rubber is simultaneously cross-linked and dispersed as fine particles of a "micro-gel" within a polyolefin matrix. Dynamic vulcanization is effected by mixing the TPO ingredients at a temperature which is at or above the curing temperature of the rubber in equipment such as roll mills, Banbury mixers, continuous mixers, kneaders or mixing extruders, e.g., twin screw extruders. The unique characteristic of the dynamically cured compositions is that, notwithstanding the fact that the rubber component is fully cured, the compositions can be processed and reprocessed by conventional rubber processing techniques such as extrusion, injection molding, compression molding, etc. Scrap or flashing can be salvaged and reprocessed.

The term "dynamically vulcanized alloy" (DVA) as used in the specification and claims means a composition comprising a thermoplastic ethylene copolymer resin and a rubber wherein at least a part of the rubber has been dynamically vulcanized to a fully cured state. The compositions are prepared by blending together the polyolefin resin and rubber with curatives and fillers under conditions of dynamic vulcanization.

In preparing the heat shrinkable DVA compositions of this invention, at least one polyolefin resin is blended with at least one rubber and the rubber is vulcanized by dynamic vulcanization. While blends of polyolefin resins may be utilized in the practice of this invention, the preferred polyolefin resin is a copolymer of ethylene with unsaturated esters of lower carboxylic acids and the DVA composition of this invention must include a polyolefin resin of the preferred class. Polyolefin resins which can optionally be incorporated in the compositions of the invention include polybutylene, LDPE and LLDPE.

The term "low density polyethylene" or "LDPE" as used in the specification and claims mean both low and medium density polyethylene having densities of about 0.910 to about 0.940 g/cc. The terms include linear polyethylene as well as copolymers of ethylene which are thermoplastic resins.

Linear low density polyethylene (LLDPE) is a relatively new class of low density polyethylene characterized by little, if any, long chain branching, in contrast to conventional LDPE. The processes for producing LLDPE are well known in the art and commercial grades of this polyolefin resin are available. Generally, it is produced in gas-phase fluidized bed reactors or liquid-phase solution process reactors; the former process can be carried out at pressures of about 100 to 300 psi and temperatures as low as 100° C.

The term "polybutylene" as used in the specification and claims means thermoplastic resins of both poly(1-butene) homopolymer and the copolymer with, for example, ethylene, propylene, pentene-1, etc. Polybutylene is manufactured via a stereospecific Ziegler-Natta polymerization of monomer(s). Commercially useful products are of high molecular weight and isotactivity. A variety of commercial grades of both homopolymer and ethylene-butene-1 copolymer are available with melt indices that range from about 0.3 to about 20 g/10 min.

The term "ethylene copolymer resin" as used in the specifications and claims means copolymers of ethylene with vinyl acetate or an alkyl ester of an alpha, beta monoethylenically unsaturated monocarboxylic acid as well as copolymers with the acid per se. In particular, copolymers of ethylene with vinylacetate or alkyl acrylates for example methyl acrylate and ethyl acrylate can be employed. These ethylene copolymers typically comprise about 70 to about 98 wt% ethylene, preferably about 70 to 95 wt% ethylene, more preferably about 73 to about 91 wt% ethylene, the balance of copolymer being the alkyl ester. The expression "EVA" means, specifically, ethylene-vinylacetate copolymers. The ethylene-copolymer resins suitable for use in the practice of this invention have a melt index of about 0.2 to about 50 (ASTM D 1238 Condition E).

The curable rubbers which can be used in the practice of this invention include both synthetic and natural rubbers; at least one of the rubbers utilized must be vulcanizable. Illustrative, non-limiting examples of rubbers suitable for use in the practice of this invention include butyl rubber, halogenated butyl rubber, ethylene-propylene-diene rubber (EPDM), polyisoprene, polychloroprene, styrene-butadiene rubber, nitrile rubbers, chlorosulfonated polyethylene, etc.

The term "rubber" as used in the specification and claims means any natural or synthetic polymer which can be vulcanized or cured so as to exhibit elastomeric properties. Since the ethylene copolymer resins will peroxide cure, rubbers such as ethylene-propylene copolymers (EPM) which require a peroxide cure cannot be used as the curable rubber component in the practice of this invention.

The terms EPM and EPDM are used in the sense of their ASTM designations. EPM is an ethylene-propylene copolymer rubber which can be cross-linked by radiation curing or peroxide curing. EPDM is a terpolymer of ethylene, propylene and a non-conjugated diene. Illustrative non-limiting examples of suitable non-conjugated dienes are 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; tehahydroindene, methyltetrahydroindene, dicyclopentadiene; 5-isopropylidene-2-norbornene; 5-vinyl-norbornene, etc.

The term "nitrile rubber" means an acrylonitrile copolymer rubber. Suitable nitrile rubbers comprise rubbery polymers of 1,3-butadiene or isoprene and acrylonitrile. Preferred nitrile rubbers comprise polymers of 1,3-butadiene and about 20–50 wt% acrylonitrile. Any nitrile rubber which is a "solid" rubber having an average molecular weight of at least 50,000, and preferably between about 100,000–1,000,000 can be used. Commercially available nitrile rubbers suitable for the practice of the invention are described in *Rubber World Blue Book,* 1980 Edition, Materials and Compounding Ingredients for Rubber, pages 386–406.

Butyl rubber is a copolymer of an isoolefin and a conjugated multiolefin. The useful copolymers comprise a major portion of isoolefin and a minor amount, preferably not more than 30 wt%, of a conjugated multiolefin. The preferred copolymers comprise about 85–99.5 wt% (preferably 95–99.5 wt%) of a $C_4$–$C_7$ isoolefin, such as isobutylene, and about 15–0.5 wt% (preferably about 5–0.5 wt%) of a multiolefin of about 4–14 carbon atoms. These copolymers are referred to in the patents and literature as "butyl rubber"; see, for example, the textbook *Synthetic Rubber* by G. S. Whitby (1954 edition by John Wiley and Sons, Inc.), pages 608–609, etc. The term "butyl rubber" as used in the specification and claims includes the aforementioned copolymers of an isoolefin having 4–7 carbon atoms and about 0.5 to 20 wt% of a conjugated multiolefin of about 4–10 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride offers the advantage that $AlCl_3$, a relatively inexpensive Friedel-Crafts catalyst is soluble in it, as are the isobutylene and isoprene comonomers. Additionally, the butyl rubber polymer is insoluble in the methyl chloride and precipitates out of solution as fine particles. The polymerization is generally carried out at temperatures of about $-90°$ C. to $-100°$ C. See U.S. Pat. Nos. 2,356,128 and 2,356,129 incorporated herein by reference.

The polymerization process which is carried out in a draft tube reactor is continuous. Monomer feed and catalyst are continuously introduced at bottom of the draft tube where an axial flow pump is located. The pump circulates the slurry at high velocity to provide efficient mixing and heat transfer. Polymer slurry containing about 20–30 wt% butyl rubber continuously overflows from the reactor through a transfer line.

Where the desired product is the butyl rubber itself, the slurry is fed through the transfer line to a flash drum operated at about 140–180 kPa (1.38–1.58 atm) and $65°$–$75°$ C. Steam and hot water are mixed with the slurry in a nozzle as it enters the drum to vaporize methyl chloride and unreacted monomers which pass overhead and are recovered, and the polymer is finished by water removal and drying. Where, however, it is desired to produce a halogenated butyl rubber, this can be accomplished by preparing a solution of the rubber. Of course, any halogenation techniques may be utilized.

In the preferred method of halogenation a "solvent replacement" process is utilized. Cold butyl rubber slurry in methyl chloride from the polymerization reactor is passed to an agitated solution in a drum containing liquid hexane. Hot hexane vapors are introduced to flash overhead the methyl chloride diluent and unreacted monomers. Dissolution of the fine slurry particles occurs rapidly. The resulting solution is stripped to remove traces of methyl chloride and monomers, and brought to the desired concentration for halogenation by flash concentration. Hexane recovered from the flash concentration step is condensed and returned to the solution drum.

In the halogenation process butyl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference.

The ethylene copolymer resin component of the polyolefin resins used in the practice of this invention comprises about 25 to about 100 wt% of the polyolefin resin component of the blend; preferably about 35 to about 100 wt% ethylene copolymer resin; more preferably about 45 to about 100 wt%.

When the LDPE, LLDPE or polybutylene, which may optionally be included in the polyolefin resin component of the composition, is utilized it comprises about 0 to 75 wt% of the polyolefin resin component; preferably about 10 to about 55 wt%; more preferably about 15 to about 35 wt%.

In its most preferred embodiment, the polyolefin resin component of the heat shrinkable DVA of this invention consists of ethylene copolymer resin, preferably EVA. The polyolefin resin is blended with at least one rubber and the rubber component of the blend is vulcanized using dynamic vulcanization techniques. The polyolefin resin comprises about 20 to about 90 wt% of the resin plus rubber in the DVA; preferably about 30 to about 80 wt% resin; more preferably about 40 to about 60 wt% resin. The rubber component of the DVA composition comprises about 80 to about 10 wt% of the composition, based on resin plus rubber; preferably about 75 to about 20 wt%; more preferably 60 to about 40 wt% rubber, based on the resin plus rubber component of the blend. Where it is desired to prepare a DVA for use in blown film with good heat shrink properties, the curable rubber preferably comprises about 10 to about 40 wt% of the resin plus rubber component of the DVA. The ethylene copolymer resin must comprise at least 10 wt% of the total composition, i.e., resin, plus rubber and additives; preferably at least 12 wt%; more preferably at least 15 wt%.

In addition to its polymer component, the DVA composition of this invention can include reinforcing and non-reinforcing fillers, antioxidants, stabilizers, rubber processing oils, lubricants (e.g., oleamide), antiblocking agents, antistatic agents, waxes, coupling agents for the fillers, foaming agents, pigments and other processing aids known to the rubber compounding art. The pigments and fillers can comprise up to 50 wt% of the total DVA composition based on polymer component plus additives; preferably pigments and fillers comprise about 0 to about 30 wt% of the total composition.

Fillers can be inorganic fillers such as calcium carbonate, clays, silica or carbon black. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. They are derived from petroleum fractions. The type of process oil utilized will be that customarily used in conjunction with the rubber component. The skilled rubber chemist will recognize which type of oil should be utilized with a particular rubber. The quantity of rubber process oil utilized is based on the total rubber content, both cured and uncured, and can be defined as the ratio, by weight, of process oil to the total rubber in the DVA. This ratio can vary from about 0 to about 1.5/1; preferably about 0.1/1 to about 0.75/1; more preferably about 0.2/1 to about 0.5/1. Larger amounts of process oil can be used, the deficit being reduced physical strength of the composition. Oils other than petroleum based oils such as oils derived from coal tar and pine tar can also be utilized. In addition to the petroleum derived rubber process oils, organic esters and other synthetic plasticizers can be used.

Antioxidants can be utilized in the composition of this invention—the particular antioxidant utilized will depend on the rubbers utilized and more than one type may be required. Their proper selection is well within the skill of the rubber processing chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating or shield the part from oxygen, ozone, etc.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Non-limiting examples of these and other types of antioxidants are styrenated phenol; 2,2'-methylene-bis(4-methyl-6-1, butylphenol); 2,6'-di-t-butyl-o-dimethylamino-p-cresol; hydroquinone monobenzyl ether, octylated diphenyl amine, phenyl-beta-naphthylamine; N,N'-diphenylethylene diamine; aldol-alpha-naphthylamine; N,N'-diphenyl-p-phenylene diamine, etc. The physical antioxidants include mixed petroleum waxes and microcrystalline waxes.

Any conventional cure system for the rubber to be dynamically vulcanized can be used except that peroxide cures are specifically excluded from the practice of this invention. Under conditions which would result in a fully cured rubber using peroxide, the ethylene copolymer resin would vulcanize, thereby resulting in a fully cured non-thermoplastic composition. Otherwise, any particular curatives known in the art for the vulcanization of rubbers are suitable. These include sulfur cures as well as non-sulfur cures. For example, halogenated butyl rubber can be cured using zinc oxide. Of course, accelerators such as dithiocarbamates or thiurams and thioureas can be included in these zinc oxide cures. Zinc oxide free cures of halogenated butyl rubber known to the art can also be utilized. For example, such vulcanizing systems comprise litharge, 2-mercaptoimidazoline and dipheyl guanidine.

Resin cures can be used for both butyl rubber, halogenated butyl rubber and the EPDM rubbers. The resins useful as curatives are phenolic resins, brominated phenolic resins, urethane resins, etc. The halogenated resin cure systems are generally metal activated where the rubber is an EPDM.

While phenolic resin cures are suitable cures, they impart a yellowish or orangish tinge to the rubber part. For halogenated butyl rubber, a preferred cure is one based on ZnO and/or MgO. Such cures permit the use of pigments such as $TiO_2$ to give bright white compositions. In this system, the MgO acts not as an accelerator but as acid acceptor to stabilize the rubber from dehalogenation.

It is within the scope of this invention to incorporate an uncured rubber in the composition. This can be accomplished by selecting as the uncured rubber a rubber which cannot be vulcanized by the vulcanizing agent used to cure the rubber which is to be dynamically vulcanized. For example, where the rubber to be cured is a halogenated rubber and the cure system comprises ZnO, any other rubber which requires sulfur or another curative to vulcanize it or is not vulcanizable can be included. Such rubbers include EPDM, EPM, polyisobulytene, natural rubber, etc. In another embodiment the DVA can be prepared from the resin and the rubber to be dynamically vulcanized. After vulcanization a second uncured rubber can be blended into the DVA at a temperature above the melting point of the resin.

In another embodiment of this invention, two rubbers are blended together and one of them is dynamically vulcanized using a curative which is not a vulcanizing agent for the other rubber, thereby forming a composition comprising a fully vulcanized rubber dispersed within the unvulcanized rubber. This composition can then be let down into an ethylene copolymer to form the composition of this invention.

In a variant of this invention, a first rubber is dynamically vulcanized while in intimate contact with an ethylene copolymer utilizing an excess of vulcanizing agent to form the DVA of this invention. Thereafter, additional rubber is added and dynamically vulcanized, the quantity of curative having been preselected to ensure that it is inadequate to fully vulcanize the additional rubber.

Another variant, the DVA of this invention is prepared using an ethylene copolymer and one rubber. Subsequently, under conditions of dynamic vulcanization a second rubber is added to the DVA with only sufficient curative to partially cure the second rubber. For example, EVA and an EPDM are blended and a sulfur curative added. The EPDM is dynamically vulcanized to form the DVA of this invention. Subsequently, chlorobutyl rubber is added with just sufficient ZnO to only partially cure the chlorinated butyl rubber.

Where an uncured rubber is included in the DVA composition of this invention, it comprises 0 to about 25 wt% of the total rubber in the composition, preferably about 5 to about 20 wt%.

While any combination of rubbers may be utilized, the preferred rubbers are halogenated rubber which can be ZnO cured; e.g., halogenated butyl rubber and polychloroprene. These polymers when ZnO cured result in products which have a low odor and have broad FDA compliance in uses such as pharmaceutical enclosures, I.V. solution bag port caps, stoppers, syringes, jar seals, food storage bins, etc.

In a preferred embodiment, the rubber to be vulcanized is chlorinated or brominated butyl rubber. Halogenated butyl rubbers are preferably vulcanized with zinc oxide cures. Sulfur-bearing accelerators can be utilized with the zinc oxide. This accelerator will generally not vulcanize sulfur curable rubbers such as EPDM when used at the low levels necessary to cure halogenated butyl rubber.

Illustrative of accelerators which can be used in conjunction with ZnO for curing halobutyl rubber are 2,6-di-tert-butyl-para-cresol; N,N'-diethylthiourea; di-ortho-tolylguanidine; dipentamethylene thuiram tetrasulfide ethylene trithiocarbonate; 2-mercapto-benzothiazole; benzothiazole disulfide; N-phenyl-beta-naphthylamine; tetramethyl thuiram disulfide, zinc diethyldithiocarbamate, zinc dibutyldithiocarbamate, and zinc dimethyldithiocarbamate. Formulations for the ZnO cure of halobutyl rubber are well known in the art. A preferred cure system comprises MgO, ZnO and zinc diethyl-dithiocarbamate since this system results in a vulcanized rubber with low compression set.

In the practice of this invention the polyolefin resin and rubber are mixed together at a temperature sufficient to soften the resin or, more commonly, at a temperature above its melting point where the resin is crystalline at room temperature, e.g., EVA. After the resin and rubbers are intimately mixed, the curative is added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the melting point of the resin (about 90°–110° C. in the case of EVA) to about 250° C.; more typically, the temperature range is about 150° C. to about 225° C. Preferably the vulcanization is carried out at a temperature of about 160° C. to about 200° C.

It is preferred that the mixing process be continued until vulcanization is complete. If vulcanization is permitted to continue after mixing has stopped, the composition will not be reprocessible as a thermoplastic. However, the dynamic vulcanization can be carried out in stages. For example, vulcanization can be commenced at high temperatures in a twin screw extruder and before vulcanization is complete pellets can be formed of the partially prepared DVA using an underwater pelletizer, thereby quenching the curing step. At a later time vulcanization can be completed under dynamic vulcanization conditions. Those skilled in the art will appreciate the appropriate quantities, types of curatives and extent of mixing time required to carry out the vulcanization of the rubber. Where necessary the rubber can be vulcanized using varying amounts of curative to determine the optimum cure system to be utilized and the appropriate cure conditions to adhere a full cure.

While it is preferred that all components are present in the mix prior to carrying out the dynamic vulcanization process of this invention, this is not a necessary condition. For example, only the rubbers need be mixed thoroughly, followed by dynamic vulcanization in the absence of polyolefin resin. After vulcanization is complete, the dynamically vulcanized blend of rubbers can be let down into an ethylene copolymer resin to prepare the compositions of this invention.

The term "fully vulcanized" as used in the specifications and claims with respect to the dynamically vulcanized rubber component of this invention means that the rubber component to be vulcanized has been cured to a state in which the physical properties of the rubber are developed to impart elastomeric properties to the rubber generally associated with the rubber in its conventionally vulcanized state. The degree of cure of the vulcanized rubber can be described in terms of gel content or conversely extractable components. Alternatively, the degree of cure can be expressed in terms of cross-linked density.

Where the determination of extractable is an appropriate measure of the state of cure, the improved thermoplastic elastomeric compositions are produced by vulcanizing the curable rubber component blends to the extent that the composition contains no more than about four percent by weight of the cured rubber component extractable at room temperature by a solvent which dissolves the rubber which is intended to be vulcanized, and preferably to the extent that the composition contains less than two percent by weight extractable. In general, the less extractables of the cured rubber component, the better are the properties and still more preferable are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent, as well as that rubber component of the DVA which it is not intended to cure. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferredly $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is o reaction between the resin and rubber. There may be highly significant reactions involved but of limited extent. However, the assumption that the cross-link density determined as described provides a useful approximation of the cross-link density of the thermoplastic elastomeric compositions is consistent with the thermoplastic properties and with the fact that the large proportion of the resin can be removed from the composition by high temperature solvent extraction, for example, by boiling decalin extraction.

The cross-link density of the rubber is determined by equilibrium solvent swelling using the Flory-Rehner equation. *J. Rubber Chem. and Tech,* 30, p. 929. The appropriate Huggins solubility parameters for rubber-solvent pairs used in the calculation were obtained from the review article by Sheehan and Bisio, *J. Rubber Chem. & Tech.,* 39, 149. If the extracted gel content of the vulcanized rubber is low, it is necessary to use the correction of Bueche wherein the term v is multiplied by the gel fraction (%gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

In the practice of this invention resins such as LDPE, LLDPE and polybutylene can be utilized in conjunction with the ethylene copolymer resin. Generally, any resin with a crystalline melting point of less than 126° C. can be used in conjunction with the ethylene copolymer resin.

In order to produce a heat shrink composition from the DVA composition of this invention, the DVA compositions are prepared, oriented at a temperature slightly below the softening point of the polyolefin resin and "frozen" into the oriented configuration, i.e., film, tubing, tape, etc. The forming of a product and its orientation can be continuous, e.g., blown film, or can be accomplished in a separate operation. Upon subsequent heating to a temperature above the softening point of the resin, the composition will shrink.

Not wishing to be bound by the theory it is believed that the improved shrink characteristics of this invention are achieved as a result of elongation of the vulcanized rubber component during the orientation phase.

The advantages of the instant invention will be more readily appreciated by reference to the following examples. Ingredients are described in Table V.

EXAMPLE I

The compositions in Table I were Banbury mixed and underwater pelletized. The last four blends were dynamically vulcanized in the mixer by prolonging the mix at an elevated temperature after the addition of the cure agent(s). No problems were encountered in the thermoplastic process of underwater pelletization of the dynamically-vulcanized blends.

Examination of dumbbells molded from the compositions revealed that the dynamically-cured blends felt rubber-like and exhibited exceptional resiliency. Their surface was dry and had a high coefficient of friction. Vulcanization was surprisingly required to impart these characteristics. The EVA product of Run #1 had a slippery plastic feel. Similarly, the unvulcanized product of Run #2 had a slippery, oily, plastic feel. By contrast, the compositions of Runs 3, 4 and 5 had high coefficient of friction surfaces and were "snappy" with elastomeric properties. Additionally, these samples had lower compression set.

EXAMPLE II

The experiment of Example I, Run 3 was repeated with slight modifications using an EVA containing 27% vinyl acetate. The sample was dynamically vulcanized in a Banbury mixer.

The results are shown in Table II. Its very low melt flow rate attests to the fact that the elastomer has been vulcanized. Dumbbells were injection molded from the blend and from neat EVA (27% VA) and compared in properties. The CHLOROBUTYL/EVA mixture exhibited significantly lower hardness and greater resiliency, as noted by its lower tension set value. The molded dumbbell samples were exposed to 158° F. for 5 minutes in a convection air oven. The EVA samples shrunk 12% while the DVA samples shrunk 22%.

EXAMPLE III

The compositions of Runs 1, 2 and 3 of Example I were blown into film using a Sterling 1½-inch extruder and a three inch die with a 30 mil die gap. The results are shown in Table III. The composition of Example I Run 4 could not be blown into film because of the high cured rubber content, but it has utility in injection molded extruded products. In preparing the film, the blow up ratio was 2.7 while the draw down ration was 2.8. The melt temperature was 410° F.

The EVA composition of Run 1 has inherent shrink properties. However, the composition of Run 3 which includes dynamically vulcanized rubber has improved shrink properties. By comparison, the unvulcanized EVA/rubber composition of Run 2 is inferior to EVA alone.

EXAMPLE IV

Compositions of Example II was also blown into film using a 1½-inch Sterling line equipped with a 24/1 L/D extruder and a 30-mil die gap. The properties of the resulting film are listed in Table IV. The film processed easily on the thermoplastic equipment and is characterized by low stiffness, excellent toughness (high impact strength, puncture strength, and tear strength), and very good recovery properties after extension to 100%.

TABLE I

| | RUN # | | | | |
|---|---|---|---|---|---|
| | 1[(1)] | 2[(1)] | 3 | 4 | 5 |
| EVA (9% VA) | — | — | — | — | 20 |
| EVA (18% VA) | 94 | 54 | 54 | 32 | — |
| CHLOROBUTYL 1065 | — | 33 | 33 | 50 | — |
| CHLOROBUTYL 1066 | — | — | — | — | 58.8 |
| Atomite | 3 | 3 | 3 | 3 | 3 |
| Titanox 2071 | 2 | 2 | 2 | 2 | 2 |
| Primol 355 Oil | — | 7 | 7 | 11 | — |
| Sunpar 2280 Oil | — | — | — | — | 10 |
| Syloid 244 FP | 0.2 | 0.2 | 0.2 | 0.2 | — |
| Oleamide | 1 | 1 | 1 | 1 | — |
| Irganox 1076 | 0.1 | 0.1 | 0.1 | 0.1 | 0.1 |
| Ultranox 626 | 0.1 | 0.1 | 0.1 | 0.1 | 0.1 |
| MgO | 0.5 | 0.5 | 0.5 | 0.5 | 0.5 |
| Zinc Oxide | — | — | 2.5 | 3.5 | 4.0 |

TABLE I-continued

| | RUN # | | | | |
|---|---|---|---|---|---|
| | 1[1] | 2[1] | 3 | 4 | 5 |
| Stearic Acid | — | — | 0.7 | 0.8 | 1.0 |
| ZDEDC | — | — | — | — | 1.2 |
| Banbury Mix Time, mins. | 4 | 4 | 10 | 10 | 10 |
| Discharge Temperature, °F. | 390 | 390 | 380 | 420 | 390 |
| Tensile Strength (psi) | 1580 | 600 | 715 | 480 | 275 |
| Elongation % | 520 | 490 | 450 | 310 | 160 |
| Injection Molded Dumbells - Cool Mold | | | | | |
| Hardness, Shore A Instantaneous Reading | 80 | 70 | 73 | 66 | 55 |
| Tension Set, %[2] | 50 | 43 | 30 | 30 | 10 |
| Compression Set B, Plied, % 22 Hrs. @ 158 F. | 91 | 87 | 78 | 64 | 36 |

[1]Controls - outside of the scope of the invention.
[2]Extension to 100%, hold one minute, allow to relax one minute.
[3]Sample failed while being held at 100% elongation.

TABLE II

| | RUN # | |
|---|---|---|
| | 1 | 2 |
| EVA (27% VA, 3 MI) | 51.8 | 100 |
| CHLOROBUTYL 1065 | 34.5 | — |
| Flexon 766 Oil | 6.25 | — |
| Titanox 2071 | 2.5 | — |
| Atomite | 3.75 | — |
| Syloid 244 FP | 0.25 | — |
| Oleamide | 1.25 | — |
| Irganox 1076 | 0.25 | — |
| Ultranox 626 | 0.13 | — |
| MgO | 0.49 | — |
| Zinc Oxide | 2.41 | — |
| MFR @ 230 C., dg/min | 0.06 | |
| Physical Properties Injection Molded Dumbbells - (Nozzle temperature 55° F.; Mold temperature 100° F.) | | |
| Shore A Hardness, | | |
| Initial | 69 | 83 |
| 10 Seconds | 62 | 77 |
| 100% Modulus, psi | 670 | 1160 |
| 300% Modulus, psi | 1045 | 1625 |
| Tensile Strength, psi | 1260 | 1640 |
| Ultimate Elongation, % | 440 | 310 |
| Tension Set, % | 40 | 53 |
| Comments - | Pigmented, Rubber-like Surface, Resilient | Clear, Plastic-like Surface |

TABLE III

BLOWN FILM PROPERTIES (4 MIL)

| | RUN # | | |
|---|---|---|---|
| Typical Film Properties | CONTROL 1 | 2 | 3 |
| Tensile Strength, psi @ Break | | | |
| MD | 2,300 | 1,770 | 1,430 |
| TD | 3,670 | 1,335 | 1,350 |
| Elongation, % @ Break | | | |
| MD | 925 | 620 | 595 |
| TD | 695 | 615 | 630 |
| Elmendorf Tear, g/mil | | | |
| MD | 138 | 274 | 275 |
| TD | 176 | 275 | 258 |
| COF[1], | | | |
| outside-outside | 0.01 | 0.20 | 0.14 |
| inside-inside | 0.01 | 0.57 | 0.74+ |
| % Shrinkage at 100 C. (No Additional Orientation) | | | |
| MD | 49.5 | 42 | 62 |
| TD | 4.5 | 5 | 25 |
| % Heat Shrink Recovery at 100 C. (50% extension at 100 C.) | | | |
| MD | 78 | 96 | 100 |
| TD | 83 | 78 | 94 |

[1]ASTM D-1984-63 (procedure A)

TABLE IV

| Film Properties (4 mil Blown, 2.5 BUR) | |
|---|---|
| Tensile Strength, psi @ Break | |
| MD | 1,350 |
| TD | 1,135 |
| Elongation, % @ Break | |
| MD | 580 |
| TD | 630 |
| Elmendorf Tear, g/mil | |
| MD | 234 |
| TD | 221 |
| Recovery from 100% Extension at room temperature (%) | |
| MD | 84 |
| TD | 78 |

TABLE V

INGREDIENT LIST

| DESIGNATION | DESCRIPTION | SUPPLIER |
|---|---|---|
| CHLOROBUTYL 1066 | Chlorinated isoprene - isobutylene copolymer, 51-60 (1 + 8) 100°0 C. | Exxon Chemical Americas |
| ZDEDC | Zinc diethyl dithiocarbonate | several |
| CHLOROBUTYL 1065 | Chlorinated isoprene - isobutylene copolymer, 40-50 ML (1 + 8) 100° C. | Exxon Chemical Americas |
| Flexon 766 | Napthenic process oil | Exxon Company USA |
| Atomite | Natural Ground calcium carbonate, mean particle size 3 microns | Thompson, Weinman & Company |
| Titanox 2071 | Titanium dioxide | NL Indus., Inc. |
| Oleamide | Long chain fatty acid amide | Several |
| Syloid 244 FP | Micron-sized synthetic silica, 2.1 sp. gr. | W.R. Grace & Co. |
| Irganox 1076 | Octadecyl 3-(3',5'-di-tert-butyl-4'-hydroxyphenyl) propionate | Ciba Geigy |
| Ultranox 626 | Bis (2,4-di-t-butylphenyl) Pentacrythritol Diphosphite | Borg-Warner Chemicals, Inc. |
| Prinol 355 | Paraffin white oil | Exxon Company USA |
| Sunpar 2280 | Paraffinic oil ASTM D 2226 type 104B | Sun Petroleum Co. |

What is claimed is:

1. A heat shrinkable, thermoplastic elastomeric composition comprising a polyolefin resin wherein the polyolefin resin comprises an ethylene copolymer resin and a butyl or halogenated butyl rubber wherein at least a part of the rubber is dynamically vulcanized to a fully cured state in the presence of the polyolefin resin except that the use of peroxide cure systems are specifically excluded and wherein said ethylene copolymer resin is selected from the group consisting of copolymers of ethylene and vinyl acetate, copolymers of ethylene with an alkyl ester of an alpha, beta monoethylenically unsaturated monocarboxylic acid and copolymers of ethylene with said acid.

2. The composition according to claim 1 wherein the ethylene copolymer resin comprises about 25 to 100 wt% of the polyolefin resin and an additional resin having a melting point of less than 126° C. comprises 0 to about 75 wt% of the polyolefin resin.

3. The composition of claim 1 wherein the polyolefin resin comprises about 20 to about 90 wt% of the resin/rubber component of the composition.

4. The composition of claim 1 wherein the vulcanized rubber comprises about 10 to about 40 wt% of the resin/rubber component of the composition.

5. The composition according to claim 2 wherein the additional resin is selected from the group consisting of LDPE, LLDPE and polybutylene.

6. The composition according to claim 1 wherein the rubber comprises about 20 to about 75 wt% of the resin/rubber component of the composition.

7. The composition according to claim 6 wherein the rubber comprises about 40 to about 60 wt% of the resin/rubber component.

8. The composition according to claim 1 wherein the rubber is a halogenated butyl rubber.

9. The composition according to claim 8 wherein the halogenated butyl rubber is chlorinated butyl rubber.

10. The composition according to claim 8 wherein the halogenated butyl rubber is brominated butyl rubber.

11. The composition according to claim 8 wherein a vulcanizing agent comprising ZnO is utilized in the dynamic vulcanization of the rubber.

12. The composition according to claim 1 wherein an inorganic filler is incorporated therein.

13. The composition according to claim 12 wherein the organic filler is calcium carbonate or clay.

14. The composition according to claim 1 wherein the polyolefin resin is an ethylene-vinylacetate copolymer.

15. The composition according to claim 14 wherein the vinylacetate content of the copolymer is about 2 to about 30 wt%.

16. The composition according to claim 15 wherein the vinylacetate content of the copolymer is about 9 to about 27 wt%.

17. The composition according to claim 1 wherein the ethylene copolymer is an ethylene-methylacrylate copolymer.

18. The composition according to claim 1 having incorporated therein 0 to about 25 wt%, based on total rubber, of an uncured rubber.

19. The composition according to claim 18 wherein the uncured rubber comprises about 5 to bout 20 wt% of the total rubber in the composition.

20. The composition according to claim 18 wherein the uncured rubber is an EPM, polyisobutylene or EPDM.

21. The composition according to claim 18 wherein the vulcanized rubber is a halogenated rubber and the uncured rubber is an EPM.

22. The composition according to claim 21 wherein the halogenated rubber is chlorinated butyl rubber or brominated butyl rubber.

23. A process for preparing a composition comprising a polyolefin resin, where the polyolefin resin is an ethylene copolymer resin, wherein said ethylene copolymer resin is selected from the group consisting of copolymers of ethylene and vinyl acetate, copolymers of ethylene with an alkyl ester of an alpha, beta monoethylenically unsaturated monocarboxylic acid and copolymers of ethylene with said acid and a fully vulcanized butyl or halogenated butyl rubber which comprises
(a) blending the resin and rubber to be vulcanized at a temperature above the melting point of the resin;
(b) adding a vulcanizing agent for the rubber, excluding a peroxide vulcanizing agent, to the resin/rubber blend; and
(c) vulcanizing the rubber under dynamic vulcanization conditions for a time sufficient to fully vulcanize the rubber.

24. The process according to claim 23 wherein an additional rubber not vulcanizable by the vulcanizing agent is incorporated.

25. The process according to claim 24 wherein the additional rubber is introduced during the blending of the resin and rubber and prior to dynamic vulcanization.

26. The process according to claim 24 wherein the additional rubber is added after the rubber to be vulcanized is fully vulcanized, blending being continued until the additional rubber is uniformly dispersed in the resin/vulcanized rubber blend.

27. The process according to claim 23 wherein an additional rubber is added to the composition after the rubber to be vulcanized is fully vulcanized; said additional rubber being vulcanizable by the vulcanization agent; provided, however, that the vulcanizing agent is fully consumed during the dynamic vulcanization step and is unavailable to vulcanize any part of the additional rubber.

28. The process according to claim 23 wherein an additional rubber which is vulcanizable by the vulcanizing agent is added to the rubber/resin blend after the rubber to be vulcanized is fully vulcanized; said vulcanizing agent being present in an amount sufficient to at least partially cure the additional rubber, but insufficient to fully vulcanize the additional rubber.

29. The process according to claim 24 wherein the additional rubber is EPM or polyisobutylene.

30. The process according to claim 27 wherein the rubber to be fully vulcanized is a halogenated rubber and the additional rubber is a halogenated rubber.

31. The process according to claim 30 wherein the halogenated rubbers are each chlorinated butyl rubber.

32. The process according to claim 28 wherein the rubber to be fully vulcanized is a halogenated rubber and the additional rubber is a halogenated rubber.

33. The process according to claim 32 wherein the rubbers are each chlorinated butyl rubber.

* * * * *